Aug. 11, 1970
D. J. CRIMMINS ET AL  3,523,844
METHOD AND APPARATUS FOR MAKING FLEXIBLE
MULTICONDUCTOR FLAT CABLE
Original Filed May 6, 1964
4 Sheets-Sheet 1
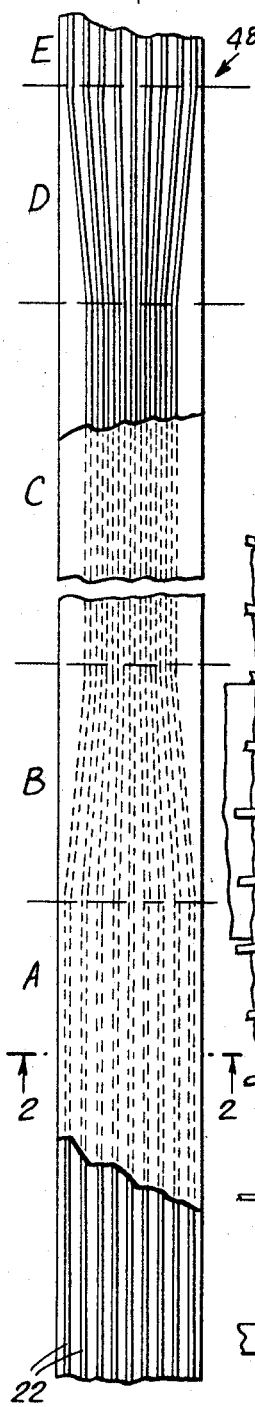
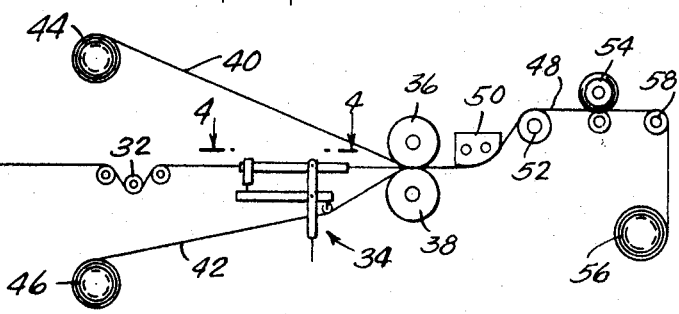
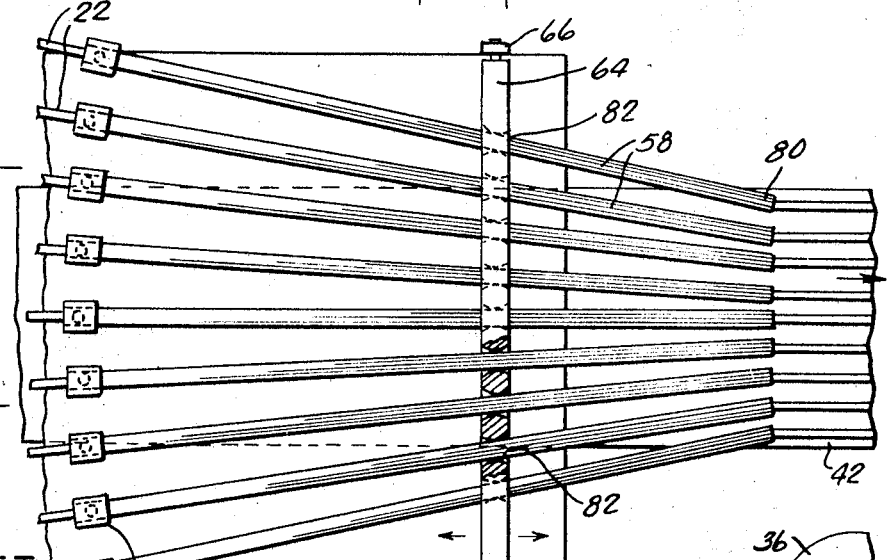
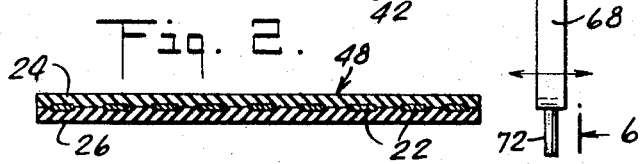
INVENTORS
DAVID J. CRIMMINS
ROCCO F. BASILE
JOSEPH W. BREAKFIELD
ATTORNEYS

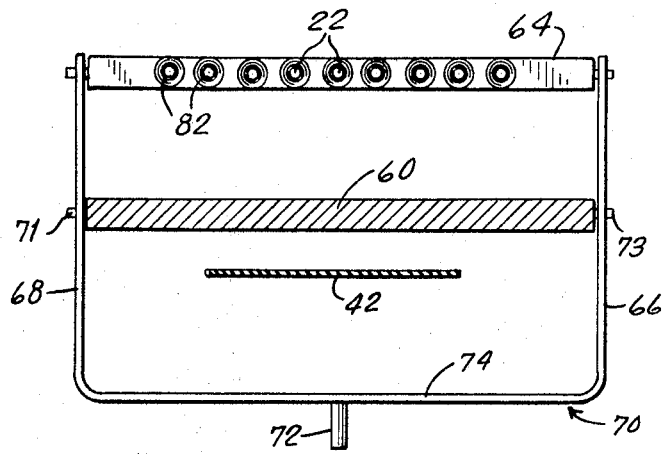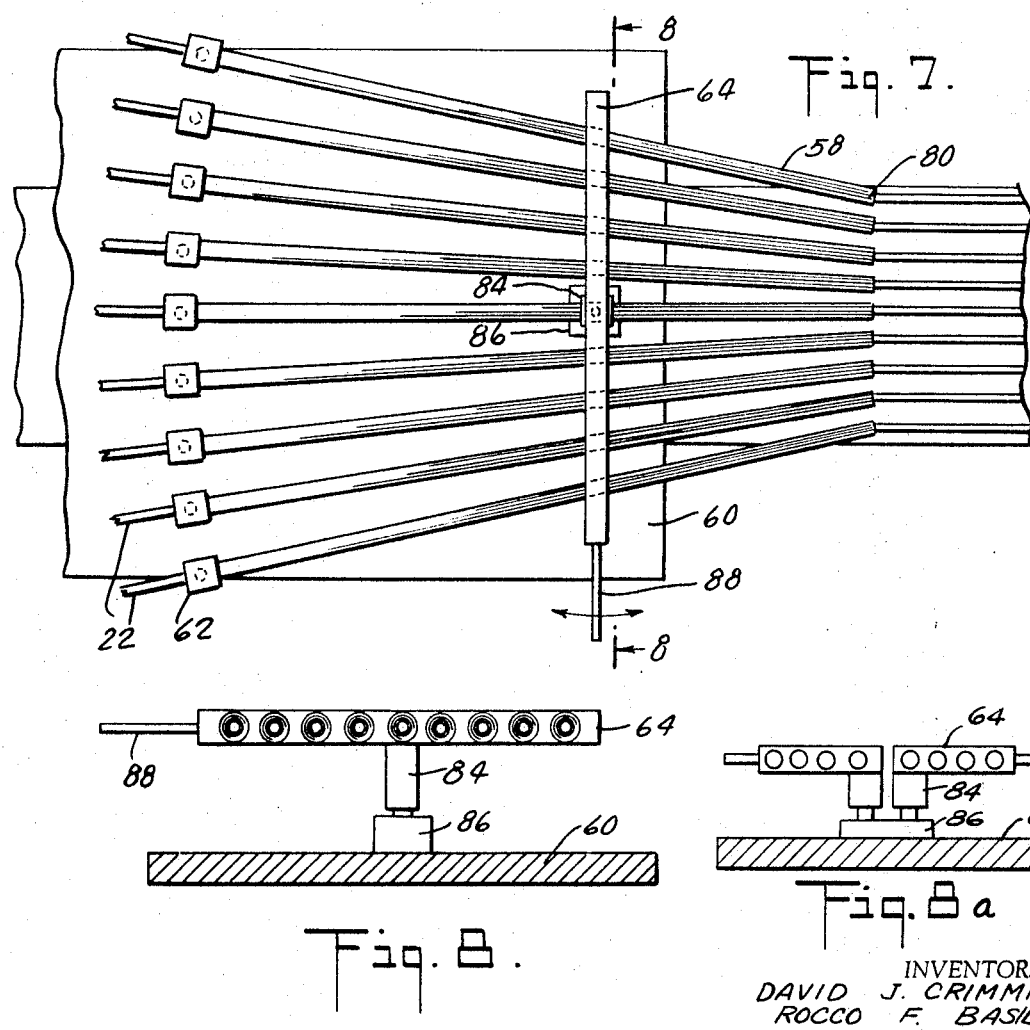

Aug. 11, 1970    D. J. CRIMMINS ET AL    3,523,844
METHOD AND APPARATUS FOR MAKING FLEXIBLE
MULTICONDUCTOR FLAT CABLE
Original Filed May 6, 1964    4 Sheets-Sheet 3

INVENTORS
DAVID J. CRIMMINS
ROCCO F. BASILE
JOSEPH W. BREAKFIELD

Kenyon & Kenyon
ATTORNEYS

Aug. 11, 1970  D. J. CRIMMINS ET AL  3,523,844
METHOD AND APPARATUS FOR MAKING FLEXIBLE
MULTICONDUCTOR FLAT CABLE
Original Filed May 6, 1964  4 Sheets-Sheet 4

INVENTORS
DAVID J. CRIMMINS
ROCCO F. BASILE
JOSEPH W. BREAKFIELD

Kenyon & Kenyon
ATTORNEYS

United States Patent Office 3,523,844
Patented Aug. 11, 1970

3,523,844
METHOD AND APPARATUS FOR MAKING FLEXIBLE MULTICONDUCTOR FLAT CABLE
David J. Crimmins, Pennington, and Rocco F. Basile, Roselle, N.J., and Joseph W. Breakfield, Norristown, Pa., assignors to Thomas & Betts Corporation, Elizabeth, N.J., a corporation of New Jersey
Application Apr. 23, 1965, Ser. No. 451,698, which is a continuation-in-part of application Ser. No. 365,414, May 6, 1964. Divided and this application Jan. 20, 1967, Ser. No. 610,507
Int. Cl. B65h 57/28; H01b 13/22
U.S. Cl. 156—52
22 Claims

ABSTRACT OF THE DISCLOSURE

Method and apparatus for making multiconductor flat cable. Individual guide means are provided for varying the position of individual conductors before insulation is applied to the conductors to form the cable. In a preferred embodiment of the apparatus, linkages are connected to the guide means and a cam is provided which, in conjunction with the linkages, causes the guide means to move, thereby to variably position the conductors before insulation is applied.

---

This application is a division application of co-pending United States application S.N. 451,698 for "New and Improved Multiconductor Cable and Method and Apparatus For Making Same" filed Apr. 23, 1965 by David J. Crimmins, Rocco F. Basile, and Joseph W. Breakfield, now abandoned, which is a continuation of U.S. application S.N. 365,414 filed May 6, 1964 for "Method and Apparatus For Producing Variably Spaced Multiconductor Cable," now abandoned.

This invention relates to new and improved multiconductor cable and to a new and improved method and apparatus for making same and more particularly to new and improved multiconductor flat cable in which the spacing and/or positioning of the conductors of the cable may be variable and to a new and improved method and apparatus for varying the spacing and/or positioning of the conductors of multiconductor flat cable.

Multiconductor flat cable is well known in the art. Such cable has the characteristics of being flexible and having a plurality of parallel conductors with constant spacing between individual conductors throughout the length of the cable. Heretofore, the uses of such cable have been circumscribed due to the limitations inherent in having the spacing constant between the conductors of the cable and in having the position of the conductors constant throughout the length of the cable. In applications where it has been necessary to have variable spacing between conductors, or variable positioning of the conductors of the cable, multiconductor flat cable could not be used and other techniques such as printed circuitry had to be employed.

Although it is possible to achieve variable spacing and variable positioning of conductors by printed circuit techniques, such techniques have their limitations in that they are expensive and involve a number of individual steps to produce a multiconductor strip. Furthermore, such techniques basically involve piecework type operations and thus are unsuitable for the production of continuous cable. The most common methods of producing printed circuits are by etching and by plating, both of which involve a plurality of steps. In the more common etching process, a resist pattern corresponding to the desired conductor pattern is applied to a copper foil which is bonded to a rigid insulation base such as plastic laminate or the like. The resist pattern may be applied in any well known manner such as by brush, by silk screening, by printing or the like. In addition, the resist pattern may be applied by a photographic process in which the negative of the conductor pattern is superimposed on a photosensitive film covering the copper foil. The film is then exposed to ultra-violet light to harden the exposed areas of the film and any unexposed areas are removed from the copper foil. Irrespective of how the resist pattern is applied to the copper foil, the exposed copper is then etched away and the resist dissolved from the non-exposed areas. Copper conductors in the desired pattern are thus left on the insulation base. The copper is then cleaned and an upper coating of insulation applied. In the plating process, a rigid insulation base is first coated with a very thin film of silver, the silver film then being coated with a plating resist in such a pattern as to leave the exposed areas in the form of the conductor pattern. Copper is then deposited on the silver and the plating resist removed by a solvent. The exposed silver film is then removed by acid etching, leaving the copper plating in the desired conductor pattern.

By means of the present invention, the inherent disadvantages and limitations of the prior art methods and apparatus for making multiconductor flat cable and of printed circuitry are overcome.

It is thus an object of the present invention to provide new and improved multiconductor flat cable in which the pitch, spacing and/or position of one or more conductors is varied throughout at least a portion of the length of the cable.

It is another object of this invention to provide a new and improved method and apparatus for producing multiconductor flat cable in which the pitch, spacing and/or position of one or more conductors of the cable is varied throughout at least a portion of the length of the cable.

It is still another object of the present invention to provide a new and improved method and apparatus for producing multiconductor flat cable wherein the relative spacing or positioning of each conductor in the cable may be individually controlled according to a pre-determined pattern.

Other and further objects of this invention will be readily apparent from the following description and drawings wherein:

FIG. 1 is a fragmentary partially sectional view of a multiconductor flat cable made according to the present invention;

FIG. 2 is an elevational view taken along line 2—2 of FIG. 1;

FIG. 3 is a schematic of one apparatus for producing multiconductor flat cable and including one embodiment of the apparatus of the present invention;

FIG. 4 is a fragmentary partially sectional plan view taken along line 4—4 of FIG. 3;

FIG. 5 is an exploded partially sectional elevational view of the embodiment of the present invention shown in FIG. 3;

FIG. 6 is a front partially sectional elevational view taken along line 6—6 of FIG. 5;

FIG. 7 is a fragmentary top plan view of another embodiment of the apparatus of the present invention;

FIG. 8 is a front partially sectional elevational view taken along line 8—8 of FIG. 7;

FIG. 8a is a view similar to that of FIG. 8 showing a modification to the apparatus of FIG. 7;

Figure 9:
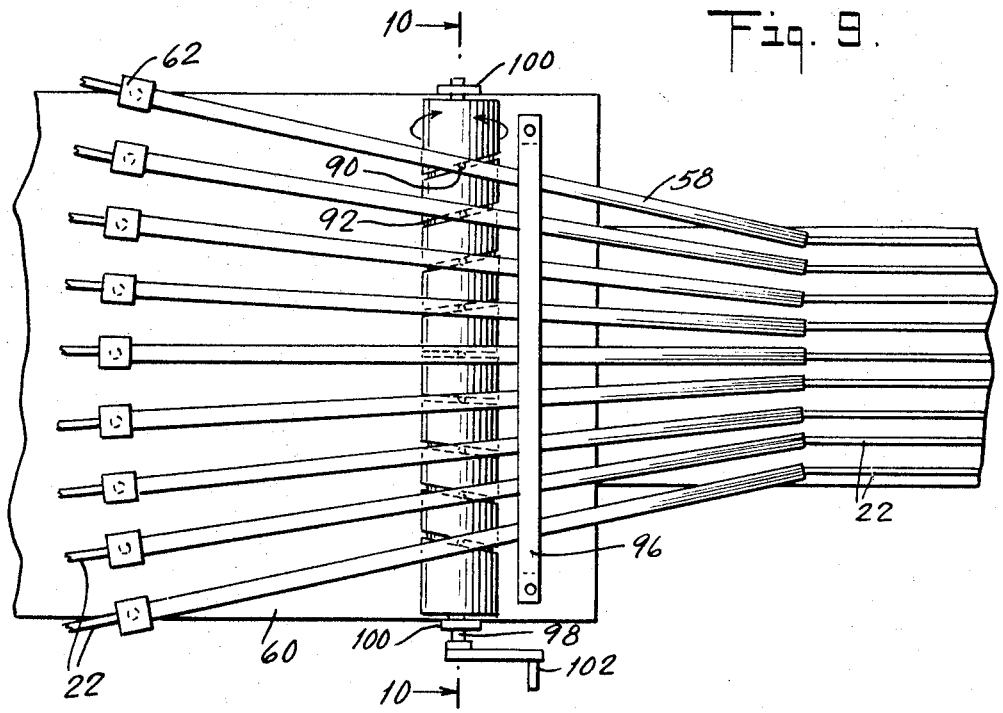
FIG. 9 is a fragmentary top plan view of another embodiment of the apparatus of the present invention.

Referring now to the drawings, FIGS. 1 and 2 show a segment of multiconductor flat cable generally denoted by 48 having a plurality of conductors 22 sheathed between two sheets of insulation material 24 and 26 which are bonded together. Although conductors 22 are shown as being of rectangular cross-section, it will be understood that conductors 22 may be of any cross-sectional shape such as round, elliptical, etc. Conductors 22 may also be of any conductive material such as copper, aluminum, etc., and may be of any cross-sectional dimensions. In addition, the cross-sectional shapes and dimensions of different conductors of a cable may be different and the cross-sectional shape and dimensions of a single conductor may vary along the length thereof. Where the cross-sectional shape of an individual conductor 22 is rectangular, the conductor may be formed by slicing individual conductors from a sheet of conductive material such as copper or it may be formed by rolling flat initially round wire.

Insulation sheets 24 and 26 may be of any suitable material such as plastic, rubber, etc. It is preferable that these sheets be as thin as possible, keeping in mind the desired electrical insulation properties of the cable, so that the cable be as flexible as possible. This allows for easy manipulation of the cable, etc. Where sheets 24 and 26 are of thermoplastic material, they may be bonded together by the application of pressure and heat. Where one or both of the sheets is coated with heat sensitive adhesive material, pressure and heat will cause the sheets to bond. Where one or both of the sheets is coated with a pressure sensitive adhesive material, only pressure need be applied to bond the sheets together. Sheets 24 and 26 may be of different insulation material. In addition to the use of insulating sheets, any method, well known to those skilled in the art, of applying insulation to conductors 22 may be used to form the multiconductor flat cable of the present invention.

Referring now to FIG. 1, the variable spacing between the individual conductors 22 of cable 48 is shown more clearly by referring to sections A, B, C, D and E of cable 48. Section A of cable 20 shows the spacing between individual conductors 22 as constant throughout the length thereof. Section B of cable 20 shows the spacing between individual conductors 22 as gradually decreasing toward section C. Section C shows the spacing between individual conductors 22 as constant throughout the length thereof, but as less than the spacing between individual conductors as shown in section A. Section D shows the spacing between individual conductors 22 as gradually increasing toward section E. Section E shows the spacing between individual conductors to be constant. The spacing shown in section E may be the same as or different from the spacing shown in section A. Although a particular pattern of spacing of individual conductors is illustrated in FIG. 1, it will be understood that any pattern of spacing desired may be employed and still be within the scope of the present invention. Thus, it may be desirable to vary the spacing of only one conductor of the cable while maintaining the spacing between the other conductors of the cable constant. It may also be desirable to have individual conductors discontinuous along the length of the cable. Other patterns of variably spaced multiconductor flat cable will be evident to those skilled in the art that are within the scope of the present invention.

It will also be evident to those skilled in the art that instead of varying the spacing between the conductors of the multiconductor flat cable, the present invention embraces multiconductor flat cable in which the spacing between conductors is maintained constant, but the relative positioning of the conductors is varied along at least a portion of the length of the cable. Thus according to the present invention, the conductors of the multiconductor cable may follow an irregular path along the length of the cable while maintaining constant spacing between conductors along such path. For example, according to the present invention, a plurality of constantly spaced conductors of a multiconductor flat cable follow a straight path along one portion of the cable, follow a curved path along the next portion of the cable and follow a further straight path along the next portion of the cable with the conductors being laterally displaced with respect to the first straight portion. It will be understood that any pattern of constantly spaced conductors may be produced along the length of a cable and still be within the scope of the present invention. It will also be understood that any pattern of variably spaced conductors may be combined with any pattern of constantly spaced variably positioned conductors in the same multiconductor cable.

FIG. 3 schematically illustrates one embodiment of the apparatus of the present invention for making multiconductor cable. As shown, a plurality of conductors 22 wound up on reels 30 are fed between tensioning rollers 32 to conductor guide means, generally denoted at 34. As explained in more detail below, guide means 34 is adapted to vary the spacing and/or positioning of individual conductors 22 before insulation is applied thereto. After being spaced and/or positioned by means 34, conductors 22 are fed into the nip of rollers 36 and 38 between two sheets of suitable insulation material 40 and 42, respectively wound on drums 44 and 46. Upper roll 36 may be heated to a temperature sufficient to cause sheets 40 and 42 to flow around conductors 22 such that each conductor is covered with insulation and sheets 40 and 42 are bonded together to form a multiconductor, insulated flat cable. Insulation material 40 and 42 may not be bonded to the conductors, depending upon the type of insulating materials used, the type of conducting materials used, whether or not adhesive material is used, whether or not a release agent is used, etc. In addition, the insulating material may be bonded to some conductors while not being bonded to other conductors. Roller 38 is preferably rubber sheathed and rotates in a clockwise direction, roller 36 rotating in a counterclockwise direction.

The completed cable 48 may then be passed over a cooling shoe 50 which is cooled by any suitable means such as running cold water. Cable 48 then passes over idler roller 52, the shaft roller 52 being adjustable for alignment and camber in cable 48. Slitting machine 54 is provided to slit individual cables from a wide sheet comprising a plurality of cables and to remove excess insulation material along the selvages. Individual cables 48 are then wound up on take-up reels 56 after passing over idler roller 58.

Referring now to FIGS. 4, 5, and 6, there is shown in more detail the embodiment of the guide means of the present invention schematically illustrated in FIG. 3.

As shown in FIG. 4, a plurality of guides, which may for example be tubes 58, adapted to space individual conductors 22, are pivotally mounted on a frame 60 by means of supports 62 journalled in frame 60. Tubes 58 are fixedly secured at one end to suports 62 and are allowed to float free at their other ends. Tubes 58 are also positioned in and supported by an adjustable fulcrum which comprises a flat plate or guide bar 64, having a series of slots milled therein adapted to support individual tubes 58. Bar 64 may be constructed of an upper and a lower plate having slots respectively milled in the lower and upper faces thereof. Bar 64 is journalled in the upper ends of the vertical side members 66 and 68 of a U-shaped lever arm 70. Arm 70 is pivotally mounted on frame 60 by pins 71 and 73. Arm 70 is further provided with a handle 72 mounted on horizontal member 74 of arm 70 near the middle thereof. Frame 60 is provided with idler roller 76 adapted to guide sheet 42 into the nip 78 of rollers 36 and 38.

In operation guide means 34 operates as follows:

Individual conductors 22 are caused to pass through tubes 58 and thence to nip 78 of rollers 36 and 38. The relative spacing and/or positioning of the free ends 80 of tubes 58 will determine the relative spacing and/or positioning of individual wires 22 with respect to each other when the conductors enter the nip of rolls 36 and 38. The relative spacing and/or positioning of free ends 80 is controlled by movement of bar 64 mounted on lever arm 70. By causing bar 64 to move toward rolls 36 and 38, the spacing between individual conductors 22 will be increased. Conversely, movement of bar 64 away from rolls 36 and 38 will decrease the spacing between individual conductors 22. The slots 82 in bar 64 are shaped to such configuration that there is no interference to the angular position of tubes 58. As shown in FIG. 4, slots 82 have an hourglass-type configuration with the width of the slots being greater at the ends of the slots and narrower in the middle. Thus, as bar 64 is moved substantially parallel to the longitudinal axis of conductors 22, the curved side walls of slots 82 tend to act upon tubes 58 to position them without interfering with their angular movement. As shown in FIGS. 4–6, bar 64 is manually moved by causing lever arm 70 to pivot about plate 60. By moving handle 72 in one direction, bar 64 will be caused to move in the opposite direction. It will be understood by those skilled in the art that bar 64 could also be operated automatically. Thus, bar 64 could be operated synchronously with the cable-making machine by means of a suitable linkage. Bar 64 could also be operated automatically by means of a separate controller that could be programmed to operate tubes 58 in a predetermined manner.

The multiconductor cable of FIGS. 1 and 2 would be made as follows by utilizing the conductor guide means shown in FIGS. 4–6 in the cable-making apparatus of FIG. 3. During the making of section A of cable 48, bar 64 would be positioned near the free ends of tubes 58 such that the spacing between conductors 22 would be at its greatest. The gradual diminution of spacing between conductors 22 shown in section B (FIG. 1) is accomplished by moving bar 64 away from rolls 36 and 38 to its extreme left position. This movement of bar 64 causes the gradual reduction in the pitch or spacing between individual conductors 22. By maintaining bar 64 in its extreme left position during the making of section C of cable 48, the relatively narrower spacing between conductors 22 is kept constant throughout the length of section C. By moving bar 64 toward rolls 36 and 38, the spacing between conductors 22 is gradually increased as shown in section D. After bar 64 has reached its extreme right-hand position and has thus increased the spacing between conductors 22 to its greatest, bar 64 is maintained in this position in order to make the constant pitch cable of section E.

The relative spacing between conductors 22 at the ends 80 of tubes 58 will be maintained during the insulating operation. However, if it is desired to maintain a more precise spacing between conductors 22, a slotted bar (not shown) positioned between the ends 80 of tubes 58 and nip 78 of rolls 36 and 38 may be provided. This bar may be adapted to be locked into position during a specified period of time in order to have precise constant spacing between the conductors along a particular section of the cable.

If it is desired that a given conductor 22 maintain the relatively same position in the cable, the slot 82 of bar 64 corresponding to that particular conductor would be positioned opposite to the pivot point of the particular tube 58 so that movement of bar 64 parallel to the conductors will not cause pivotal movement of the particular tube. In like manner, any number of conductors may be maintained in the same relative position in the cable.

Instead of being pivotally mounted on frame 60, bar 64 could just as well be slidably mounted thereon. In such case, movement of bar 64 would also be substantially parallel to conductors 22 and the operation of the apparatus would be the same as described hereinabove.

Referring now to FIGS. 7 and 8, there is shown a further embodiment of the apparatus of the present invention. Bar 64, instead of being mounted on a member pivotable about a horizontal axis, is pivotable about a vertical axis by being mounted on support 84 journalled in block 86 mounted on frame 60. As in the embodiment shown in FIGS. 4–6, guide tubes 58 are pivotally mounted on frame 60 by means of supports 62 journalled in frame 60. Bar 64 is provided with a handle 88 for manual rotation of bar 64. By rotation of bar 64 in either a clockwise or a counter-clockwise direction, the ends 80 of tubes 58 will vary such that the spacing between individual conductors 22 will also be varied. It will be understood that the variation of pitch or spacing in this instance will not be symmetrical. By modifying this embodiment to provide two bars, one on either side of the pivot and individually pivotable about support 84 which would be rigidly mounted on frame 60, greater variation in the pattern of conductor spacing would be possible. Thus, by maintaining one bar in a certain position while varying the other bar, a section of cable would be produced in which the spacing of the conductors could be maintained constant on one side of the cable while the spacing of the conductors would be varied on the other side of the cable.

Figure 10:
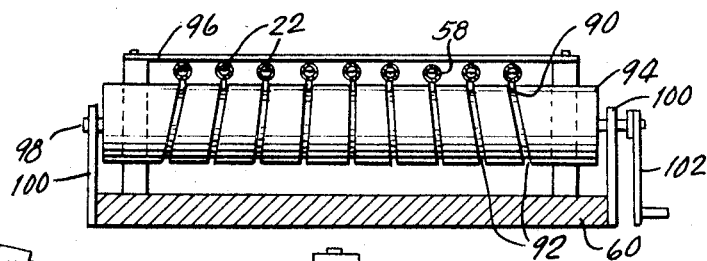
FIG. 10 is a rear partially sectional elevational view taken along line 10—10 of FIG. 9.

In the embodiment shown in FIGS. 9 and 10, guide tubes 58 are provided with pins 90. Pins 90 are adapted to ride in grooves 92 milled in the periphery of a drum 94. Bar 96 mounted on frame 60 maintains tubes 58 in contact with drum 94. Drum 94 is fixedly mounted on a shaft 98 journalled in brackets 100 mounted on frame 60. A handle 102 is provided at one end of shaft 98 for manual rotation of drum 94. Continuous grooves 92 are formed on drum 94 in such a configuration that rotation of drum 94 will cause the lateral displacement of tubes 58. The relative spacing of grooves 92 with respect to each other varies from a minimum to a maximum and back to a minimum along the circumference of the drum. As shown in FIGS. 9 and 10, rotation of drum 94 through one revolution will cause the gradual diminution of the spacing between individual conductors 22 from a maximum to a minimum and then the gradual increasing of the spacing back to a maximum. By maintaining the drum at a desired position for a fixed period of time, sections of cable may be made in which the spacing between conductors is constant along the section.

Figure 11:
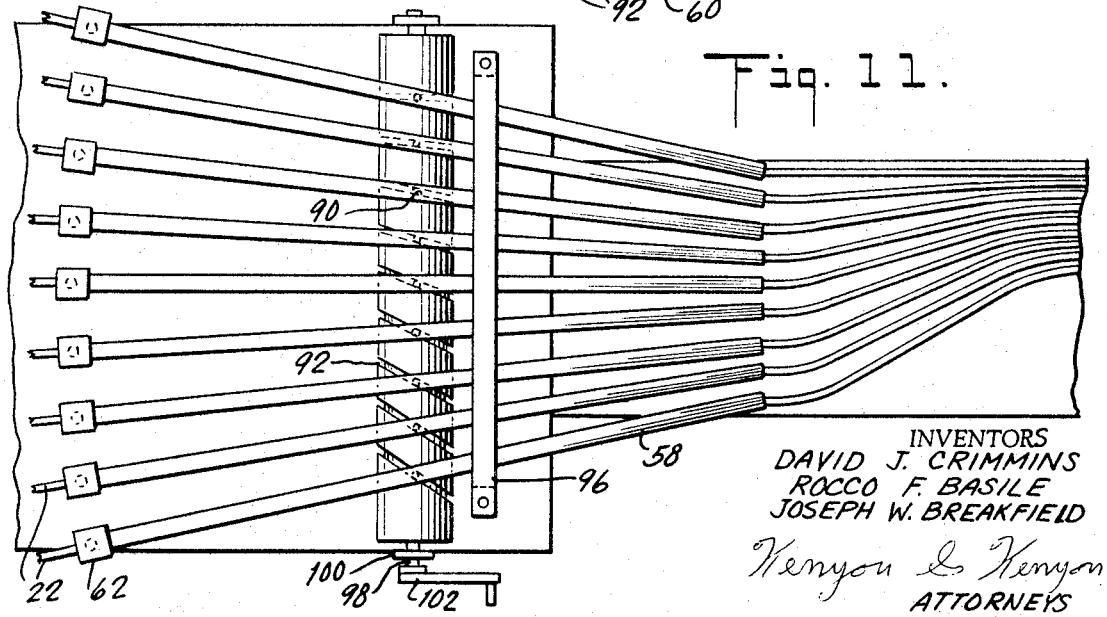
FIG. 11 is a fragmentary top plan view of a variation of the embodiment of the apparatus of the present invention shown in FIG. 9.

By varying the configuration of grooves 92 in drum 94, the pattern of spacing between the conductors 22 of a cable may be similarly varied. Thus, the configuration of the grooves shown in FIG. 11 would cause a cable to be formed in which the conductors may be concentrated on one side of the cable.

Figure 12:
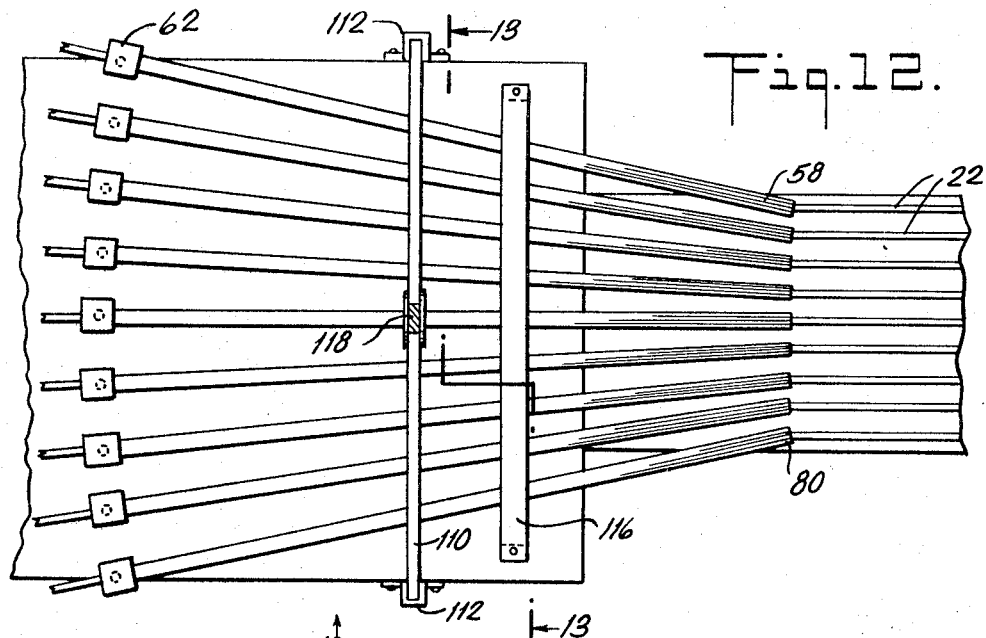
FIG. 12 is a fragmentary top plan view of still another embodiment of the apparatus of the present invention.
Figure 13:
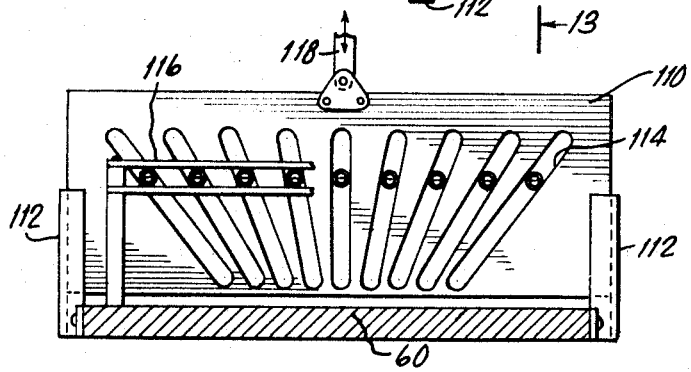
FIG. 13 is a partially sectional elevational front view taken along line 13—13 of FIG. 12.

Referring to FIGS. 12 and 13, there is shown yet another embodiment of the apparatus of the present invention. As in previous embodiments, a plurality of guides such as tubes 58 are pivotally mounted on frame 60 by suitable supports 62 journalled in frame 60. Variation of the spacing of conductors 22 is accomplished by means of a vertically disposed plate 110, which is slidably mounted in channel brackets 112 mounted on frame 60. Slots 114, milled in plate 110, provide the means by which tubes 58 may be laterally displaced with respect to each other. Tubes 68 are supported and maintained in a horizontal plane by means of a pair of spaced guide bars 116 mounted on frame 60. A linkage 118 is pivotally mounted on plate 110 for raising and lowering plate 110.

Figure 14:
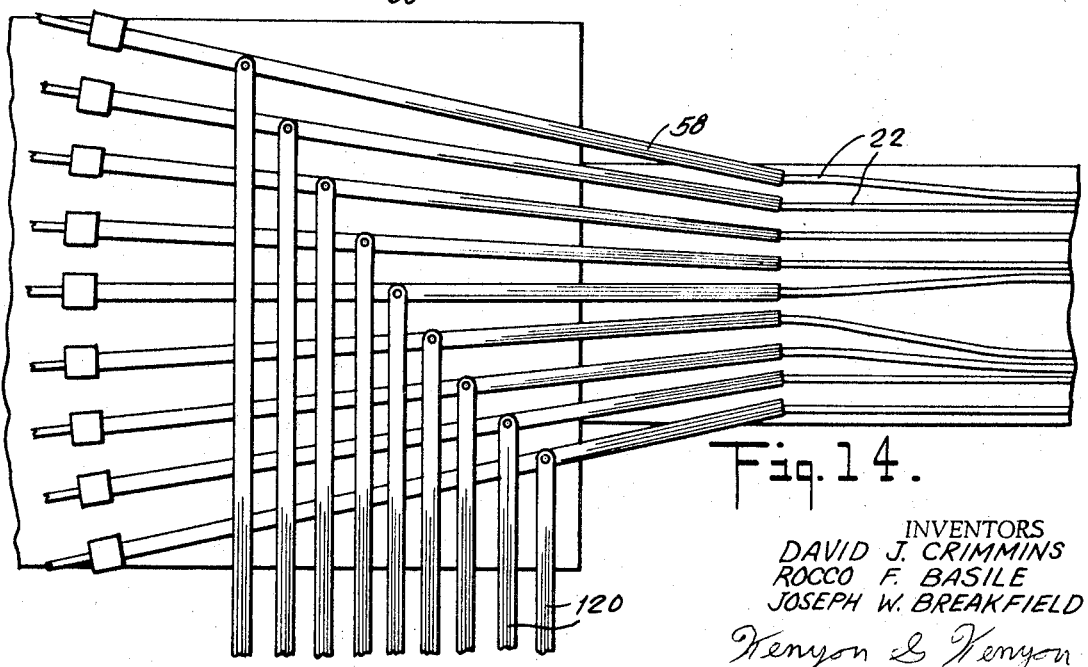
FIG. 14 is a fragmentary top plan view of yet another embodiment of the apparatus of the present invention.

In operation, the lowering of plate 110 causes the relative spacing of the free ends 80 of guides 58 to increase, thus causing the spacing between conductors 22 to be increased. Conversely, raising plate 110 will cause the spacing between the free ends 80 of tubes 58 to decrease, causing the spacing between conductors 22 to be decreased.

Where it is desired to individually control the positioning of individual tubes 58, the embodiment of the apparatus of the present invention shown in FIG. 14 may be used. As shown in FIG. 14, individual linkages 120 are pivotally connected to individual tubes 68. By controlling the individual movement of each tube 58, any desirable pattern of spacing and/or positioning of the conductors 22 may be produced. Linkages 120 may be operated manually or by a suitable mechanism which may be controlled by a programmed computer.

It will be understood that the various embodiments of the present invention described hereinabove and shown in the drawings may be suitably modified so that the spacing between individual conductors may be maintained constant while varying the positioning of the conductors along the cable. Thus, by maintaining the ends of the guides 58 in the embodiment of FIG. 14 at a constant spacing while causing the ends to be displaced laterally, the spacing of the conductors may be held constant while the conductors are displaced laterally to vary their lateral position on the cable. By means of the embodiment of FIG. 14, any configuration or combination of constantly spaced and variably spaced conductors may be created in a multiconductor cable.

Although the various embodiments of the apparatus of the present invention described above have been shown as manually operated, it will be appreciated that, through the utilization of appropriate linkages, automatic operation may be accomplished by means of synchronization with the cable-making machine, by means of a separate controller or by any other means well known to those skilled in the art.

It will also be appreciated that the configurations of the slots or grooves in the various embodiments of the present invention described hereinabove may be varied in any desired manner in order to produce multiconductor cable having any desired pattern of spacing between the conductors of the cable. Any suitable movable guide means besides pivotable tubes 58 may be utilized to guide individual conductors. In addition, any suitable means for spacing and/or positioning individual conductors besides the embodiments described hereinabove may be used and still be within the scope of the apparatus of the present invention.

It will be further appreciated that the number of conductors shown in the various drawings is for illustrative purposes only, and that cables having any number of conductors may be made by means of the apparatus of the present invention.

It will be seen that the variably spaced multiconductor flat cable of the present invention is well suited for use in electronic circuitry. Heretofore, the connecting conductors used in electronic circuitry have either been a plurality of individual wires or hard board printed circuitry. By means of the present invention, any given pattern of connecting conductors may be provided in a compact and flexible insulated strip. By drilling holes at appropriate places along the strip, various circuit components may be inserted to complete the electronic circuit. In addition, various conductors may be discontinuous along the length of the cable or individual cables may be brought out of the insulation for ease of termination of other conductors or components.

According to the method of the present invention, any of the conductor guide means described hereinabove as well as any other suitable conductor guide means may be utilized to space or position individual conductors before the application of insulation thereto. In addition, any suitable insulating means besides the rolls described hereinabove may be used to apply insulation to the conductors to form multiconductor cable.

It will be understood that the various embodiments of the present invention described hereinabove and shown in the drawings are for illustration purposes only, and that equivalents and variations thereof will be apparent to those skilled in the art. Thus, the scope of the present invention is not to be limited by such description and drawings, but rather it is to be determined by the appended claims.

What is claimed is:

1. A method of making flexible multiconductor flat cable having a plurality of conductors adapted to be spaced from one another in substantially a single plane comprising the steps of feeding a plurality of conductors in spaced relationship with respect to one another, varying the transverse spacing between at least one of said conductors and at least one other of said conductors of said plurality of spaced conductors along at least a portion of the length of either of said first mentioned or of said second mentioned conductors, one of said conductors being acted upon independently of said at least one other of said conductors, causing said plurality of spaced conductors to be fed in substantially a single plane for application of insulation thereto, and bonding at least one sheet of insulation to said plurality of conductors transversely spaced from one another in substantially a single plane such that there is produced flexible multiconductor flat cable having a plurality of conductors spaced from one another in substantially a single plane in which the transverse spacing between at least one of said conductors and at least one other of said conductors varies along at least a portion of the length of said cable.

2. The method of producing flexible multiconductor flat cable of claim 1 wherein the spacing between said conductors is varied according to a predetermined pattern which is repeated along the length of the cable.

3. The method of producing flexible multiconductor flat cable of claim 1 including the steps of removing excess selvage from said cable and winding said cable up on a reel.

4. A method of producing multiconductor flat cable having a plurality of conductors adapted to be spaced from one another in substantially a single plane comprising the steps of feeding a plurality of conductors in spaced relationship with respect to one another, variably guiding at least some of said plurality of conductors transversely relative to the remaining conductors, said at least some of said plurality of conductors being guided independently of each other, feeding said variably positioined plurality of conductors between two sheets of insulating material, and applying pressure and heat to said sheets of insulating material in order to bond said sheets of insulating material together and to embed said variably guided plurality of conductors between said sheets of insulating material.

5. The method of claim 4 including the steps of cooling said cable and winding said cable up on a reel.

6. The method of claim 5 including the further step of removing excess selvage from said cable before winding said cable up on said reel.

7. A method of making flexible multiconductor flat cable having a plurality of conductors adapted to be spaced from one another in substantially a single plane comprising the steps of feeding a plurality of conductors in spaced relationship with respect to one another, variably positioning at least one of said conductors along at least a portion of the length thereof, said at least one of said conductors being variably positioned independently of the other of said plurality of conductors, feeding said conductors between two sheets of insulating material and bonding said sheets of insulating material together, such that said conductors are supported between said sheets of insulating material.

8. The method of claim 7 wherein said step of bonding said sheets of insulating material together includes the application of pressure to bond said sheets together.

9. The method of claim 7 wherein said conductors are fed between two sheets of insulating material of thermoplastic, and wherein said bonding of said sheets of insulating material of thermoplastic includes the application of pressure and heat to said sheets of thermoplastic insulating material to bond said sheets together and to embed said conductors between said sheets of insulating material.

10. An apparatus for making multiconductor flat cable, the combination comprising a frame, a plurality of guides adapted to guide a plurality of conductors carried by said guides, each of said guides movably mounted on said frame, a plurality of linkages, one each of said linkages connected to one of said guides, and a movable cam means connected to said linkage means for causing said linkage means to move said guides, said cam means comprising a cam having a plurality of grooves and wherein each of said linkages includes cam follower means adapted to travel within said grooves, whereby movement of said guide causes said linkages to move said guides.

11. In apparatus for making multiconductor flat cable, the combination comprising a frame, a plurality of guides adapted to guide a plurality of conductors carried by said guides, each of said guides pivotally mounted on said frame, a guide bar having a plurality of slots, each of said slots having one of said plurality of guides passing therethrough, said guide bar being adapted to be moved substantially parallel to the longitudinal axis of said conductors such that movement of said guide bar along the longitudinal axis of said conductors causes movement of said guides.

12. The apparatus of claim 11 in which said guides are tubes, each tube being adapted to guide an individual conductor.

13. The apparatus of claim 11 in which said bar is pivotally mounted on said frame such as to be pivotal about a horizontal axis.

14. The combination of claim 11 in which said bar is slidably mounted on said frame.

15. In apparatus for making multiconductor flat cable, the combination comprising a frame, a plurality of guides adapted to guide a plurality of conductors, each of said guides carrying an individual conductor and being pivotally mounted on said frame, a guide bar having a plurality of slots, said guide bar adapted to support said plurality of guides at a distance from the pivoted ends thereof, each guide of said plurality of guides being carried within one of said slots of said bars, said guide bar being pivotally mounted on said frame such as to be pivotable about a vertical axis, whereby rotation of said guide bar in a clockwise or counterclockwise direction causes movement of the free ends of said guides.

16. The apparatus of claim 15 wherein said guide bar is comprised of two oppositely disposed sections, each of said sections being independently pivotable about a vertical axis.

17. In apparatus for making multiconductor flat cable, the combination comprising a frame, a plurality of guides adapted to guide a plurality of conductors, each of said guides carrying an individual conductor and being pivotally mounted on said frame, a cylinder rotatably mounted on said frame, said cylinder having a plurality of circumferential grooves in its periphery along the longitudinal axis thereof, each of said guides having follower means adapted to follow in one of said grooves of said cylinder.

18. The apparatus of claim 17 including in combination a bar mounted on said frame adapted to maintain said followers of said tubes in said grooves of said cylinder.

19. In apparatus for making multiconductor flat cable, the combination comprising a frame, a plurality of guides adapted to guide a plurality of conductors, each of said guides carrying an individual conductor and being pivotally mounted on said frame, and a vertically disposed plate slidably mounted on said frame, said plate having a plurality of substantially vertically running slots, each of said slots adapted to have an individual guide running therethrough.

20. The apparatus of claim 19 including in combination support means mounted on said frame for supporting said guides in a horizontal plane and being adapted to permit movement of said guides in said plane.

21. In apparatus for making multiconductor flat cable, the combination comprising a frame, a plurality of guides adapted to guide a plurality of conductors, each of said guides carrying an individual conductor and being pivotally mounted on said frame, and a plurality of linkages, one each of said linkages being linked to one each of said guides.

22. The apparatus of claim 19 including in combination control means for independently controlling each of said linkages and programmer means to actuate said control means.

References Cited

UNITED STATES PATENTS

| 2,729,055 | 1/1956 | Tobias. | |
| 1,512,096 | 10/1924 | Hopkinson | 156—439 X |
| 1,914,801 | 6/1933 | Chadwick | 156—440 |
| 2,690,313 | 9/1954 | McDermott | 242—157 |
| 3,168,617 | 2/1965 | Richter | 174—117 |
| 3,239,916 | 3/1966 | Love | 174—117 |
| 3,270,122 | 8/1966 | Binek | 156—52 X |
| 3,272,679 | 9/1966 | Hebberling | 156—440 |
| 3,361,616 | 1/1968 | Scharf | 156—179 |

JOHN T. GOOLKASIAN, Primary Examiner

D. J. FRITSCH, Assistant Examiner

U.S. Cl. X.R.

156—177, 179, 436, 440; 174—117